(12) United States Patent
Bayle et al.

(10) Patent No.: US 7,811,340 B2
(45) Date of Patent: Oct. 12, 2010

(54) MULTI-STAGE FACILITY AND METHOD FOR GASIFYING A FEEDSTOCK INCLUDING ORGANIC MATTER

(75) Inventors: Jérôme Bayle, Lyons (FR); Eric Marty, Lyons (FR)

(73) Assignees: Institute Francais du Petrole, Cedex (FR); Commissariat al'Energie Atomique, Cedex (FR)

( * ) Notice: Subject to any disclaimer, the term of this patent is extended or adjusted under 35 U.S.C. 154(b) by 1103 days.

(21) Appl. No.: 10/784,235

(22) Filed: Feb. 24, 2004

(65) Prior Publication Data

US 2004/0182003 A1 Sep. 23, 2004

(30) Foreign Application Priority Data

Feb. 24, 2003 (FR) ................................. 03 02252

(51) Int. Cl.
| | |
|---|---|
| *B01J 7/00* | (2006.01) |
| *B01J 8/18* | (2006.01) |
| *H01M 8/06* | (2006.01) |
| *C10J 3/08* | (2006.01) |
| *C10J 3/68* | (2006.01) |
| *F27B 15/00* | (2006.01) |

(52) U.S. Cl. ............................... 48/61; 48/62 R; 48/77; 48/197 R; 422/139

(58) Field of Classification Search ............ 48/197 FM, 48/197 R, 61

See application file for complete search history.

(56) References Cited

U.S. PATENT DOCUMENTS

| 3,912,465 | A | | 10/1975 | Kunii ......................... 48/101 |
|---|---|---|---|---|
| 3,998,607 | A | * | 12/1976 | Wesselhoft et al. ....... 48/197 R |
| 4,032,305 | A | | 6/1977 | Squires ......................... 48/73 |
| 4,322,222 | A | * | 3/1982 | Sass ......................... 48/197 R |
| 4,344,373 | A | * | 8/1982 | Ishii et al. .................. 110/347 |
| 4,347,064 | A | | 8/1982 | Reh ......................... 48/197 R |
| 4,704,138 | A | | 11/1987 | Smith ......................... 48/210 |

FOREIGN PATENT DOCUMENTS

DE 19909484 9/2000

* cited by examiner

*Primary Examiner*—Alexa D Neckel
*Assistant Examiner*—Matthew J Merkling
(74) *Attorney, Agent, or Firm*—Antonelli, Terry, Stout & Kraus, LLP.

(57) ABSTRACT

Facility for producing synthesis gas from a solid feedstock including organic matter, said facility including means for circulating a heat-carrying solid providing the heat necessary for such production, and several stages including gasification means (Z1, Z3), intermediate separation means (Z2, Z4) for separating the effluents coming from each stage, and combustion means (Z5).

17 Claims, 1 Drawing Sheet

Figure 1:
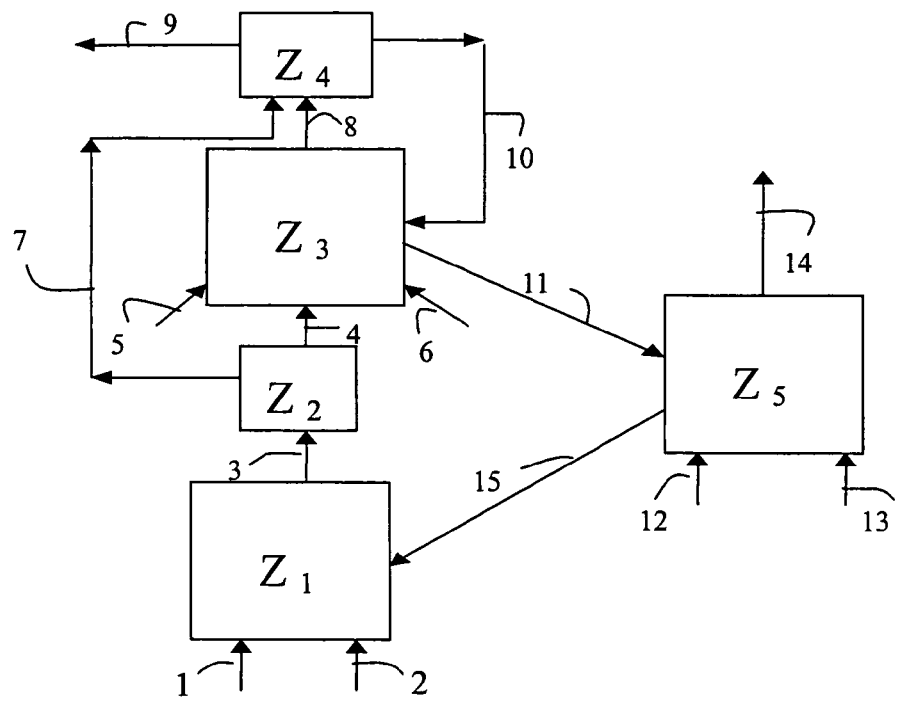

MULTI-STAGE FACILITY AND METHOD FOR GASIFYING A FEEDSTOCK INCLUDING ORGANIC MATTER

The present invention relates to a facility and a method for producing synthesis gas from a solid feedstock including organic matter, typically biomass.

A combustible synthesis gas can be produced from a solid feedstock containing an organic fraction by pyrolysis (also known as thermolysis) or by gasification according to known methods, for example those described in European Patent Applications EP0692677 and EP1077248.

The operations enable feedstocks including, at least in part, organic matter such as biomass, industrial or household waste, and industrial or sewage treatment sludge, to be reclaimed.

As is known, pyrolysis (or thermolysis) is a thermal degradation process that takes place in the absence of air, hence of oxygen, and leads to formation of a gaseous phase and a solid residue. Gasification corresponds to partial oxidation of the feedstock, and this oxidation can be continued until the feedstock is almost entirely converted, i.e. conducted under conditions such that only a gaseous phase and a very small fraction of solid residues are produced.

The two operations lead to production of a combustible synthesis gas with a high to moderate heat value that can be used as a fuel in known energy production methods, such as boilers, engines, and turbines. Moreover, when the quality of the gas, particularly its carbon monoxide and hydrogen content, permits, this gas can also be used as reagents for synthesis or conversion processes, for example as part of Fisher-Tropsch separation, methanol separation, and hydrogen production.

Gasification or thermolysis reactions are highly endothermic. To supply the energy necessary for the reaction, it is known that, for example, the energy supplied by combustion of either the solid part resulting from the thermolysis process or the solid residue resulting from incomplete gasification of the initial feedstock can be used.

The energy transfer may be direct, i.e. said solid is fed to burners that heat the casing of the thermolysis or gasification furnace, as described in U.S. Pat. No. 4,300,915.

However, such a design is difficult to implement, particularly due to the poor quality of this fuel.

According to another possible method, the energy transfer can be indirect and a heat carrier, also called a coolant, is used.

In particular it is possible to use solid particles, which can be catalytic, according to principles comparable to those used in fluidized-bed catalytic cracking. An example of such a design is given in U.S. Pat. No. 5,494,653 in which solid catalyst particles facilitating the reaction are then regenerated in a combustion reactor, the high-temperature solid then being recirculated to the gasifier, playing the role of a reaction heat carrier.

However, if acceptable conversion rates and yields of a synthesis gas having an acceptable heat value are to be obtained, such an arrangement involves very large reaction volumes and correspondingly high manufacturing costs.

Several solutions have been proposed for obtaining high gasification or pyrolysis yields.

For example, U.S. Pat. No. 4,077,778 offers a method for complete conversion of the feedstock by using two successive dense fluidized beds with residence times in each bed of approximately several hours.

According to another example, U.S. Pat. No. 5,961,786 offers ultrapyrolysis, i.e. pyrolysis done with very short residence times of approximately or even less than one second to improve the quality of the synthesis gas eventually obtained.

International Application WO 00/06671 discloses another solution according to which the synthesis gas from the pyrolysis zone is burned and the heat of combustion furnishes the energy needed for a further step in which the solid residue coming from said zone is gasified.

None of these known solutions, however, achieve the following satisfactorily and concomitantly:
- deep conversion of the initial feedstock,
- global capacity of the facility as high as several tons to several tens of tons per hour,
- high heat value synthesis gas, with a high level of carbon monoxide and hydrogen,
- satisfactory heat balance,
- reasonable reaction volumes, i.e. compatible with industrial application.

According to the invention, a facility for producing synthesis gas from a solid feedstock including organic matter, said facility including means for circulating a heat-carrying solid providing at least some of the heat necessary for such production, a zone Z1 including pyrolysis and gasification means, a zone Z2 including separation means, a zone Z3 including gasification means, a zone Z4 including separation means, and a zone Z5 including combustion means, is characterized in that zone Z1 has means for pyrolysis and gasification of said feedstock in a transported fluidized bed, in that zone Z2 has means for at least partial separation of the effluents from zone Z1 into an essentially gaseous phase and into an essentially solid phase, in that zone Z3 is supplied at least in part with said essentially solid phase and includes dense fluidized bed gasification means for gasification of said essentially solid phase, in that zone Z4 includes means for separating the effluents coming from zone Z3 into an essentially gaseous phase and into an essentially solid phase, and in that zone Z5 includes means for combusting the essentially solid phase coming from zone Z3 and means for transferring the heat-carrying solid coming from said combustion into zone Z1.

Zone Z5 can have means for combusting the essentially solid phase coming from zone Z4.

The pyrolysis/gasification zone Z1 can include means for supplying a reactive carrier gas, means for introducing said feedstock and means for injecting the heat-carrying solid.

The combustion zone Z5 has means for introducing an oxidizing gas and means for transferring the heat-carrying solid coming from said combustion, to zone Z1.

The facility may have means for transferring the essentially gaseous phase coming from zone Z2, to separation zone Z4.

The combustion zone Z5 may include:
- a first zone Z'5 including transported fluidized bed combustion means for combusting part of the essentially solid phase coming from zone Z3 and/or Z4,
- a zone Z6 for separating the gaseous phase and the essentially solid phase coming from said combustion,
- a zone Z7 including dense fluidized bed combustion means for combusting the essentially solid phase coming from zone Z6 and means for transferring the heat-carrying solid coming from said combustion, to zone Z1.

The gasification zone Z3 may include reactive carrier gas supply means.

The combustion zone Z3 may include means for introducing the feedstock.

The combustion zone Z5 may include means for supplying an additional fuel.

The invention also relates to a method for implementing a facility, said method including:

a step of processing, in a transported fluidized bed, a solid feedstock including organic matter under pyrolysis and gasification conditions;

a step of at least partial separation of the synthesis gas and the solid phase coming from said transported fluidized bed step;

a step of dense fluidized bed processing of said solid phase coming from the separation step under gasification conditions;

a step of at least partial separation of the synthesis gas and the solid phase coming from said dense fluidized bed step;

a step of combustion of the solid phase coming from the separation step;

a step of recycling said heat-carrying solid regenerated in said transported fluidized bed processing step.

The transported fluidized bed processing step may be carried out in the presence of a carrier gas reacting with said feedstock and of a hot heat-carrying solid.

The combustion step may be carried out under conditions enabling the regenerated heat-carrying solid contained in the solid phase to be brought to a temperature of between 700 and 1100° C.

The heat-carrying solid may include at least one element selected from the group comprised of ores of the dolomite, mica, olivine, trona, borax, bentonite type or their derivatives, or an inert support impregnated by metal salts or by alkaline or alkaline-earth salts, the alumina silicas having an acid nature.

The feedstock may have a particle size of between 0.1 and 100 mm.

The reactive carrier gas from the gasification zones may include water vapor or carbon dioxide or a mixture of these two compounds.

The reactive gas may include hydrogen and/or methane and/or carbon monoxide.

The temperature of the transported fluidized bed and dense fluidized bed processing steps is between 600 and 1000° C., the temperature of the combustion step may be between 800 and 1200° C., and the initial ratio between the reactive carrier gas and the feedstock may be between 0.1 and 5.

The average residence time of the solid particles in the transported fluidized bed may be between 0.5 and 20 seconds inclusive and the average residence time of the solid particles in the dense fluidized bed may be between 30 seconds and one hour inclusive.

The feedstock may be selected from the group comprised of biomass, household and/or industrial waste, industrial or sewage treatment sludge, agricultural residues and by-products, and earth polluted by hydrocarbons.

Figure 2:
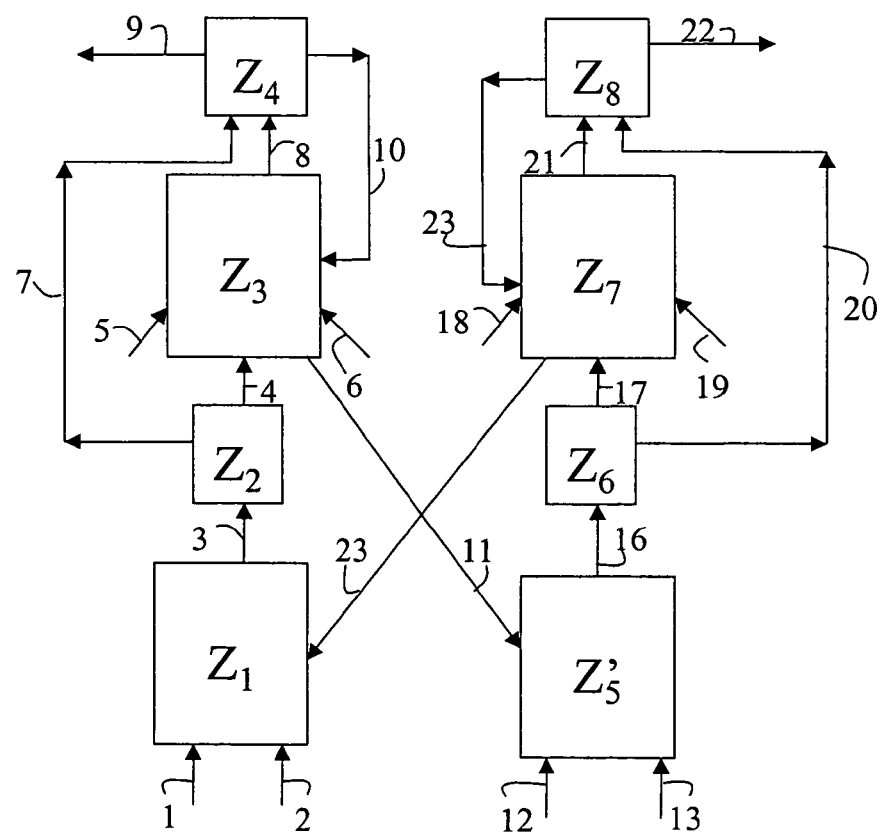

Other advantages, details, and features of the invention will emerge from reading the description of two embodiments, provided as illustrative and not limiting examples, with reference to:

FIG. 1, which shows schematically a gasification facility according to the invention, and FIG. 2 which shows schematically a variant of FIG. 1.

The design of the facility according to the invention as shown in FIG. 1 comprises five distinct zones:

a pyrolysis and gasification zone Z1 having a tubular reactor operating on the principles of a transported fluidized bed, two zones Z2 and Z4 for separation into a gaseous phase and a solid phase, a gasification zone Z3 having a reactor operating on the principles of a dense fluidized bed, a combustion zone Z5.

In zone Z1, pyrolysis and partial gasification of the feedstock take place, said feedstock including at least some organic matter such as organic matter such as biomass, industrial or household waste, and industrial or sewage treatment sludge. The feedstock is comprised of particles with an average diameter of 0.1 to 100 mm, preferably 0.5 to 10 mm.

Said pyrolysis and gasification is conducted in a tubular reactor operating on the principles of a transported fluidized bed. "Transported fluidized bed" is understood in the context of the present description to mean that the rise rate of the gases, measured by the ratio between the flowrate of the carrier gas introduced and the cross section of the reactor, is greater than the terminal sink rate in the reactor of the fraction of particles with the largest diameter. Within said transported fluidized bed, the solid particles are entrained with the feedstock by a reactive carrier gas that usually reacts with the feedstock, such as water vapor, alone or in a mixture with another gas such as $CO_2$, CO, $H_2$, or $CH_4$. Without departing from the framework of the invention, said reactive carrier gas can be $CO_2$, alone or mixed with water vapor or another gas, such as CO, $H_2$, or $CH_4$. In general, and in order to eventually obtain a synthesis gas with a high heat value, the level of oxidizing gas, for example oxygen or air, must be minimized and, in any event, will advantageously be less than 10% molar, even less than 5% molar. The tubular reactor also has a temperature gradient, with the maximum temperature of said reactor being between 600 and 1000° C., preferably between 700 and 950° C., and the temperature difference between the two ends of the reactor being between 50 and 250° C. In addition, hot particles of heat-carrying solid coming from combustion zone Z5 are injected at the hottest end of the reactor, mixed with the reactive carrier gas and the feedstock, thus enabling said gradient to be established.

The feedstock containing the organic matter is introduced by means 1 with a gaseous reagent introduced by means 2 into a transported fluidized bed of heat-carrying solid.

The heat-carrying solid may, not restrictively, be a natural ore or a mixture of natural ores, possibly shaped, such as dolomite, mica, olivine, bentonite, trona, borax, or other derivatives, or an inert (sand, silica) or active (alumina, dolomite, olivine, charcoal) support that can contain metals (Ni, Cu, Fe, Zn, etc.), or compounds containing alkaline salts or alkaline-earth salts. Said heat-carrying solid may include an alumina silica of an acid nature, preferably such as those used in the fluidized bed-cracking (FBC) methods of converting heavy residues resulting from petroleum distillation. Usually, said gaseous reagent is water vapor, carbon dioxide, or a gas including a high concentration of at least one of these gases.

The initial mass ratio, i.e. at the inlet to zone Z1, between the gaseous reagent and the feedstock, may be between 0.1 and 5, preferably between 0.4 and 1. Depending on the size of the injected solid particles (of feedstock and/or of heat-carrying solid), the conditions for introducing the fluids, particularly the carrier gas, are generally adjusted so that the surface velocity at which the gases are introduced inside the tubular reactor is between 1.5 and 25 m/s and preferably between 4 and 10 m/s. These two flows can be introduced together or separately into zone Z1, with or without staging. Zone Z1 can include one or more vertical tubular reactors, with the fluids preferably progressing according to the invention in rise mode. It will not however be a departure from the invention if said progression is in drop mode, for example according to principles similar to those described in U.S. Pat. No. 6,296,812.

In a typical configuration in rise mode, the voids ratio in the initial lower zone in which the organic feedstock is injected measuring the density of the solid particles in the flow is typically between 50 and 98%, and preferably between 70 and 95%. Still in the case of a rise mode configuration, the flow is far more dilute in the downstream part of the reactor due in particular to reactions generating substantial volume expansion of the gases. The voids ratio in the upper part of the reactor is thus typically between 80 and 99.9.%, preferably between 95 and 99.9%. The use of a tubular reactor operating on the principles of a transported fluidized bed also enables the partial pressure of the carrier gas, for example water vapor, to be at a maximum at the reactor inlet, i.e. approximately 100%. According to a preferred embodiment of the invention in which the carrier gas includes at least 90% or even at least 95% molar of water, said partial water pressure advantageously enables increased production of synthesis gas throughout the length of the reactor due to its effect on the kinetics of the residue gasification reactions and cracking of the tars produced by pyrolysis.

It was thus found by the applicant that application of the conditions described above favors, in zone Z1:
  in a lower part of the reactor, formation by pyrolysis of a high-heat-value synthesis gas and formation of a highly reactive carbon residue;
  in an upper part of said reactor, partial gasification of said carbon-containing residue resulting from pyrolysis under the action of the water vapor as well as cracking of most of the tars generated by the pyrolysis stage;
  selectivity of the method: the reaction process in zone Z1 is characterized by its selectivity, i.e. it advantageously yields a synthesis gas with a very good heat value and a high level of carbon monoxide and hydrogen.

The experimental conditions and gas rise rates can be adjusted by any known technology such that the residence times of the feedstock inside said transported bed reactor are approximately 0.5 to 20 seconds and preferably approximately 2 to 10 seconds.

Gas-solid separation means Z2 supplied by a line 3 enable the effluents from zone Z1 to be separated. Any known gas-solid separation means may be used according to the invention. For example, it is possible to use a centrifugal-type separator as described in Patent EP 1017762.

The separation means in zone Z3 enable at least some of the gaseous components, or synthesis gas, to be evacuated through a gas outlet line 7. According to the hydrodynamic configuration of the separator, for example depending on whether the solids outlet is or is not submerged in the fluidized bed of zone Z3, the efficiency of gas-solid separation may be adjustable, so that the flexibility of the method may be enhanced. In a preferred configuration where the separator solids outlet is submerged, a generally small fraction of gas, between 2 and 15% molar of gas, is entrained into the solids outlet of the separator, i.e. via line 4, with the solid phase being comprised of the heat-carrying solid and the carbon-containing solid residues. In a configuration where the solids outlet of the separator is not submerged, a large fraction of gas, between 15% and 90% molar, preferably 15 to 70% molar, is entrained into the solids outlet of the separator via line 4. The essentially gaseous fraction recovered at the zone Z2 outlet is evacuated directly via line 7, advantageously connected to zone Z4. Most of the solid phase containing solid residues and heat-carrying solid particles resulting from such separation is sent to a gasification zone Z3 via line 4. In general, the separation rate is limited by the performance of the devices used, and it is preferable to use known apparatus to bring about effective separation, for example centrifuge-type separators. As an example, mass separation of the solid phase in zone Z2 may be between 50 and 99%, generally between 75 and 95%, i.e. between 75% and 95% of the solid entering zone Z3 via line 4. The minor fraction of the solid phase is evacuated by gaseous-component outgoing line 7.

Zone Z3 corresponds to a gasification zone operated in a dense fluidized bed. "Dense fluidized bed" is understood in the present description to mean a bed of dense particles for which the superficial velocity of the gases in the reactor is less than the terminal drop velocity in the reactor of the fraction of particles with the largest diameter but greater than the superficial velocity of the gas needed to achieve sufficient fluidization of the bed. As a general rule, this velocity will be at least 2 to 10 times the minimum rate of fluidization of the mixture of solid particles. For example, the superficial velocity of the gas in the fluidized bed may be between 0.1 and 1.5 m/s, preferably between 0.3 and 1 m/s.

For example, the voids ratio of said dense fluidized bed may be between about 40 and 60%, preferably between 45 and 55%. Typically, the fraction of solid particles entrained by elutriation may be between 0.5 and 20 kg of solid per cubic meter of gas, typically approximately 3 to 15 kg of solid per cubic meter of gas.

Said zone Z3 enables gasification reactions to be effected under conditions favoring a high conversion rate of carbon-containing solid residues coming from zone Z1 into synthesis gas by gasification, for example between 30 and 99%, preferably between 40 and 60%, of the mass of solid residue entering said zone. Without departing from the framework of the invention, additional feedstock containing the organic matter can be introduced into zone Z3 by means 5, as can additional gaseous reagent by means 6. The gaseous reagent is generally of the same type as that in zone Z1 and can preferably contain a majority proportion of water. Said introduction may be effected with or without staging, according to the invention. Depending on the desired feedstock conversion rates, and the desired synthesis gas yield, the residence times of the solid residues inside reaction zone Z3 are generally between 20 seconds and one hour, preferably between 2 and 6 minutes. The gasification temperature is uniform inside the dense fluidized bed and is generally between 600 and 1000° C., preferably between 700 and 900° C. In zone Z3, the gasification reactions of the carbon-containing solid residues are essentially heterogeneous reactions with residence times and experimental conditions, particularly solid retention rate, enabling good contact between the solid-phase and gas-phase reagents and a high degree of conversion of the solid residue.

The gaseous effluents coming from zone Z3 are treated in zone Z4 via line 8 with the gaseous compounds from line 7 leaving separation zone Z2. Zone Z4 corresponds to a second gas-solid separation device, generally of the cyclone type. Said device limits entrainment of solid particles in the final outlet of the synthesis gas and recycles, via a line 10, the entrained solid phase (carbon-containing solid residue and heat-carrying solid) into zone Z3 while the synthesis gas is evacuated to any known means via line 9.

Transfer means 11 enable the spent heat-carrying solid and the fraction of carbon-containing solid residue not converted into synthesis gas to be transferred from zone Z3 to a combustion zone Z5. Without departing from the framework of the invention, said transfer can also at least partially be effected from zone Z4 to zone Z5.

In combustion zone Z5, a gaseous reagent 12 including an oxidizing gas such as air, oxygen-enriched air, or oxygen is introduced by any appropriate staged or non-staged combustion technique. This gaseous reagent 12 can also contain a certain quantity of water vapor in order for example to speed up the combustion kinetics of the carbon residues.

According to a preferred embodiment of the invention, conversion of the carbon residue in zones Z1 and Z3 is optimized so that (exothermic) combustion of the unconverted part of said carbon solid residue as well as any coke deposits on the heat-carrying solid provides at least part of, and preferably essentially the whole of, the energy necessary for the highly endothermic pyrolysis/gasification and gasification reactions occurring in zones Z1 and Z3. The temperature in zone Z5 is generally between 800° C. and 1200° C.

Without departing from the framework of the invention, for example when the thermal requirements and production efficiency of the synthesis gas are high, additional fuel in the form of a hydrocarbon feedstock which is a fraction of the initial organic feedstock, or a biomass, hydrocarbon residues, fuel oil, or light gases of the methane type, can additionally be introduced by a line 13 to meet the constraints of the overall heat balance of the facility. The two flows (gas reagent and makeup fuel) can be introduced together or separately into zone Z5, with or without staging. The combustion fumes are evacuated by line 14, possibly after passing through intermediate gas-solid separation devices (not shown). The hot heat-carrying solid emerging from said combustion, the temperature of which is generally between 700 and 1100° C., preferably between 800 and 1000° C., is then recycled into gasification zone Z3 by transfer means 15.

The embodiment of the invention just described illustrates the resulting advantages of the present combination.

In particular, the method according to the invention (and the corresponding facility) proposes an original and advantageous solution enabling high-rate conversion of large amounts of a solid feedstock containing organic matter with a particle size of typically 0.1 to 100 mm (millimeters) in reaction volumes allowing for industrial operation.

More specifically, the method according to the invention allows:

1) substantial conversion of the initial feedstock containing organic matter, namely conversion rates of 60% to 99%;

2) production of a high-quality synthesis gas, i.e. a gas with a high heat value and a large proportion of carbon monoxide and hydrogen;

3) a small facility size, compatible with an industrial application;

4) a highly favorable heat balance for the facility, as the energy needed for the endothermic reactions of the pyrolysis/gasification operations is partly, essentially, or even totally supplied by combustion of the carbon residue;

5) substantial operating flexibility enabling, for example, the heat balance of the unit to be adjusted by matching the experimental conditions to the requirements, particularly when the facility is regulated; it is also possible to obtain different conversion rates or a variable synthesis gas quality or flowrate, with the adjustment options in operating the facility being provided in particular by:

the possibility of injecting a variable quantity of reagent gas into each of the reaction zones Z1 or Z3 and thus modulating the percentage of the fraction of unconverted carbon residues sent to combustion zone Z5, the possibility of varying the respective residence times of the solid and gaseous reagents in each of said reaction zones to adjust the conversion rates within each of these zones, the possibility of injecting the feedstock directly into each of reaction zones Z1 and Z3, for example to shift the heat balance of the facility by increasing the mass of solid residue in the combustion zone, the possibility of modifying the separation of the gaseous and solid effluents in separation zone Z2.

FIG. 2 shows another embodiment of the invention, differing from that described above in relation to FIG. 1, by a particular arrangement of the combustion zone. More specifically, the combustion zone is subdivided into two combustion zones Z'5 and Z7, and also includes two separation zones Z6 and Z8.

In this embodiment, the transfer means 11 allow the solid phase containing the heat-carrying solid and the carbon-containing residue not converted into synthesis gas to be transferred from zone Z3 to the first combustion zone Z'5. A gaseous reagent 12 containing an oxidizing gas preferably chosen from air, oxygen-enriched air, or oxygen, or a mixture of these various components with water vapor, is introduced in a staged or non-staged manner into combustion zone Z'5. An additional hydrocarbon feedstock which is a fraction of the initial organic feedstock, or a biomass, hydrocarbon residue, fuel oil, or light gases of the $CH_4$ type can be introduced by means 13 to meet the heat-balance constraints, particularly when the synthesis gas yield and/or initial-feedstock conversion rate has to be high. These two flows can be introduced together or separately into zone Z'5 with or without staging. A preferred form of zone Z'5 comprises at least one vertical tubular riser or dropper reactor.

Separation means, for example of the centrifugal type, enable the effluents to be stripped out. These means are included in a zone Z6 located downstream and connected by means 16 to zone Z'5. After separation, most of the solid residues and heat-carrying residue are sent to a separate combustion zone Z7 by means 17. The efficiency of separation of the solid phase is typically between 50 and 100%, more specifically between 75 and 95%. The zone Z6 separation means enable the essentially gaseous phase to be evacuated via a line 20. In general, between 30 and 100% of the gas entering zone Z6 is evacuated directly by line 20, and the rest of the gaseous effluents are entrained with the solid phase by means 17. Zone Z7 corresponds to a secondary combustion zone operated preferably in the dense fluidized bed mode to complete the solid-residue combustion reactions. A gaseous reagent of the same type as that introduced into zone Z'5 can be injected, in stages or not in stages, into combustion zone Z1 by means 18. Additional fuel in the form of a hydrocarbon feedstock which is a fraction of the initial organic feedstock, or a biomass, hydrocarbon residues, fuel oil, or light gases of the $CH_4$ type, can be introduced by means 19 for bringing the particles of heat-carrying solid to the desired temperature, generally between 750 and 1200° C., preferably between 850 and 1000° C. These two flows (gaseous reagent and additional feedstock) can be introduced together or separately into zone Z7, with or without staging.

The gaseous effluents transferred from zone Z7 by means 21 are mixed in zone Z8 with the gaseous effluents coming from line 20 and from separation zone Z6. Zone Z8 has a gas-solid separation device for limiting the entrainment of solid particles in the common combustion fume outlet 22 and recycling a major proportion of the solids entrained into zone Z7 by means 23.

Finally transfer means 23 enable the reheated and, when it has catalytic activity, regenerated heat-carrying solid to be transferred to pyrolysis/gasification zone Z1.

Also, according to a technique well known in the prior art and without departing from the framework of the invention, means for periodically replacing part of the heat-carrying solids inventory can be provided for example at the dense fluidized bed zones Z5 (FIG. 1), Z3, Z'5, or Z7 (FIG. 2). Devices for extracting the bottom ash from these various beds can also be incorporated.

EXAMPLE 1

According to Prior Art

This example is based on computer modeling of a facility (configuration A) for converting biomass into synthesis gas according to the design shown in FIG. 3 of U.S. Pat. No. 5,494,653. This modeling was done with a Pro II program from the SIMSCI Company. The facility has a dense fluidized bed zone for gasifying biomass by water vapor in the presence of a heat-carrying solid and a combustion zone for said solid. In order to rectify the heat balance between the combustion and gasification zones, 67% of the biomass is introduced into the gasification zone and 33% into the combustion zone.

The solid used is an olivine-type ore with catalytic activity whose biomass conversion performance is known (*First World Conference on Biomass for Energy and Industry*, Seville, Jun. 5-9, 2000, pages 1999-2001, James and James (Science Publishers) Ltd.).

The calculations are done for a facility with a capacity of 100 tons/hour biomass (dry base) operating at 0.4 MPa (megapascal). The biomass is sawdust whose solid particles have diameters of between 1 and 4 mm and a L/D (length to diameter) ratio of between 1 and 3.

The biomass is introduced into the gasification zone with a relative humidity of 10% in the presence of water vapor superheated to 500° C., the initial proportion of water introduced being 0.47 kg water per kg of dry biomass.

The biomass is made to contact the catalytic heat-carrying solid emerging from the combustion zone in a solid-to-biomass ratio, at the inlet of the gasification zone, of 30.1. The flowrate of heat-carrying solid in the facility is 33.7 tons/minute. The choice of these conditions provides a thermal equilibrium between the exothermic combustion zone and the endothermic gasification zone.

Said solid is introduced into the gasification zone at a temperature of 950° C. The temperature of the fluids at the outlet of the gasification zone is 800° C.

The mass of unconverted solid residue at the outlet of the gasification zone is equal to 4.9% the initial weight of the feedstock initially introduced (dry basis).

The gas composition at the outlets of the gasification and combustion zones (combuster) is given in Table 1.

TABLE 1

| Final Gas Composition | | |
|---|---|---|
| Composition by volume | Synthesis gas gasifier outlet | Fumes combuster |
| Water content (vol %) | 17.2 | 14 |
| $H_2$ content (vol %) | 38.9 | 0 |
| CO content (vol %) | 18.9 | 1 |
| $CO_2$ content (vol %) | 17.2 | 16 |
| C2-content (vol %) | 4.5 | 0 |
| Tar content (vol %) | 0.1 | 0 |
| $N_2$ content (vol %) | 2.9 | 67 |
| $O_2$ content (vol %) | 0 | 3 |
|  | 100 | 100 |

EXAMPLE 2

According to the Invention

A computer simulation based on the facility described in relation to FIG. 2 was run. The gasification (or pyrolysis/gasification) and combustion zones are each subdivided into two distinct zones. The first zone corresponds to a transported fluidized bed and the second zone, to a dense fluidized bed. These two zones are separated by gas-solid centrifuge separators as described in U.S. Pat. No. 5,055,177. The efficiency of gas/solid separation is such that 85% of the mass of the solid part coming from the first zone passes into the second zone and 96% molar of the synthesis gas produced in the first zone is recovered, the rest being transferred with the solid part to the second zone. The feedstock, the heat-carrying solid, the capacity of the facility, the total proportion of water introduced into the gasifier, and the flowrate of the solid in the facility are the same as in Example 1. On the gasification side, all the biomass is introduced at the inlet of the transported fluidized bed as well as 60% of the total water vapor injected into the staged gasification zones. The additional water vapor is injected at the inlet of the dense fluidized bed of the second gasification zone. On the combustion side, all the biomass is introduced at the inlet of the transported fluidized bed as well as 80% of the total combustion air. The additional air is injected at the inlet of the dense fluidized bed of the second combustion zone.

The solid-to-biomass ratio at the inlet of the first gasification zone is 30.1. The heat-carrying solid is introduced into the first gasification zone at a temperature of 950° C. The fluid temperature at the outlet of the second gasification zone is 800° C. The final gas composition obtained is similar to that tabulated in Table 1.

EXAMPLE 3

Comparative

This example shows, for similar material and heat balances (isoconversion and same capacity) the substantial gain effected by the reduction in reaction volume if configuration B according to the invention is implemented.

Under the conditions previously described, the diameter of the dense fluidized beds of configurations A and B (second gasification zone and second combustion zone) is optimized according to known criteria regarding superficial gas velocity at the reactor outlet. To limit entrainment of the solid in the diluted phase and mechanical attribution of the catalyst, it is actually necessary, for each configuration, to limit the superficial gas velocity in fluidized beds. In a gasification zone, the limit is thus established at 0.4 m/s, and in a combustion zone it is established at 0.6 m/s.

Likewise, the optimum transported fluidized bed diameter of configuration B (first gasification zone and first combustion zone) was determined by criteria well known to the expert in solid flows and superficial gas velocities. In particular, to avoid flow instabilities, the superficial gas velocity must be greater than the chocking velocity (to use the English term normally used by the expert in the field) and the solid flow must be adjusted to maximize contact between the reagents. The choice made corresponds to a velocity at the bottom of the transported beds of 8 m/s and a solid flow of 400 $kg/m^2/s$ in the gasification zone (13 m/s and 170 $kg/m^2/s$ respectively in the combustion zone). Under these conditions, the calculated geometric dimensions of the gasification/combustion zones are indicated in Table 2:

TABLE 2

Geometric sizing of gasification/combustion zones

| Geometry | Configuration A | Configuration B (according to the invention) |
|---|---|---|
| Staging of zones | No | Yes |
| Gasification zone | | |
| Initial diameter of transported bed (meters) | (—) | 1.3 |
| Diameter of dense fluidized bed (meters) | 11.9 | 4.0 |
| Combustion zone | | |
| Initial diameter of transported bed (meters) | (—) | 2.0 |
| Diameter of dense fluidized bed (meters) | 12.9 | 5.6 |

As can be seen in the table above, configuration B according to the invention substantially reduces the diameter of the equipment necessary to attain an identical conversion level and capacity. The gasification fluidized bed diameter is thus reduced by a factor of approximately 3 and the diameter of the combustion zone, by a factor greater than 2. Such a reduction greatly reduces the capital cost of equipment.

The invention claimed is:

1. Facility for producing synthesis gas from a solid feedstock including organic matter, said facility including means for circulating a heat-carrying solid providing at least some of the heat necessary for such production, a zone Z1 including pyrolysis and gasification means, a zone Z2 including separation means, a line for supplying gaseous and solid effluents from zone Z1 to zone Z2, a zone Z3 including gasification means, a zone Z4 including separation means, and a zone Z5 including combustion means, characterized in that zone Z1 has means for pyrolysis and gasification of said feedstock in a transported fluidized bed of the heat-carrying solid, in that zone Z2 has means for at least partial separation of the effluents from zone Z1 into an essentially gaseous phase and into an essentially solid phase comprising solid residue and heat-carrying solid, in that zone Z3 is supplied at least in part with said essentially solid phase and includes a dense fluidized bed of the heat-carrying solid for gasification of the solid residue of said essentially solid phase, in that zone Z4 includes means for separating the effluents coming from zone Z3 into a synthesis gas and an entrained solid phase, and in that zone Z5 includes means for combusting a solid phase comprising solid residue not converted into synthesis gas and spent heat-carrying solid coming from zone Z3 through a line directly connecting said zone Z3 to said zone Z5, and means for transferring the heat-carrying solid coming from zone Z5 into zone Z1.

2. Facility according to claim 1 wherein zone Z5 has means for combusting the entrained solid phase coming from zone Z4.

3. Facility according to claim 1 wherein said pyrolysis/gasification zone Z1 includes means for supplying a reactive carrier gas, means for introducing said feedstock, and means for injecting the heat-carrying solid.

4. Facility according to claim 1 wherein said combustion zone Z5 has means for introducing an oxidizing gas and means for transferring the heat-carrying solid coming from said combustion, to zone Z1.

5. Facility according to claim 1 including means for transferring the essentially gaseous phase coming from zone Z2, to separation zone Z4.

6. Facility according to claim 1 wherein said zone Z5 includes:
a first zone Z5 including transported fluidized bed combustion means for combusting part of the solid phase coming from zone Z3 and/or the entrained solid phase coming from zone Z4,
a zone Z6 for separating the gaseous phase and the essentially solid phase coming from said combustion,
a zone Z7 including dense fluidized bed combustion means for combusting the essentially solid phase coming from zone Z6 and means for transferring the heat-carrying solid coming from said combustion, to zone Z1.

7. Facility according to claim 1 wherein zone Z3 includes reactive carrier gas supply means.

8. Facility according to claim 1 wherein zone Z3 includes means for introducing the feedstock.

9. Facility according to claim 1 wherein said zone Z5 includes means for supplying an additional fuel.

10. Facility according to claim 2 wherein said pyrolysis/gasification zone Z1 includes means for supplying a reactive carrier gas, means for introducing said feedstock, and means for injecting the heat-carrying solid.

11. Facility according to claim 2 wherein said combustion zone Z5 has means for introducing an oxidizing gas and means for transferring the heat-carrying solid coming from said combustion, to zone Z1.

12. Facility according to claim 2 including means for transferring the essentially gaseous phase coming from zone Z2, to separation zone Z4.

13. Facility according to claim 2 wherein said zone Z5 includes:
a first zone Z5 including transported fluidized bed combustion means for combusting part of the solid phase coming from zone Z3 and/or the entrained solid phase coming from zone Z4,
a zone Z6 for separating the gaseous phase and the essentially solid phase coming from said combustion,
a zone Z7 including dense fluidized bed combustion means for combusting the essentially solid phase coming from zone Z6 and means for transferring the heat-carrying solid coming from said combustion, to zone Z1.

14. Facility according to claim 2 wherein zone Z3 includes reactive carrier gas supply means.

15. Facility according to claim 2 wherein zone Z3 includes means for introducing the feedstock.

16. Facility according to claim 2 wherein said zone Z5 includes means for supplying an additional fuel.

17. Facility according to claim 1 wherein the heat-carrying solid comprises at least one material selected from the group consisting of ores of dolomite, ores of mica, ores of olivine, ores of trona, ores of borax, ores of bentonite, derivatives of ores of dolomite, derivatives of ores of mica, derivatives of ores of olivine, derivatives of ores of trona, derivatives of ores of borax, derivatives of ores of bentonite, an inert support impregnated by metal, metal salts or by alkaline or alkaline-earth salts, and an active support comprising at least one material selected from the group consisting of alumina, dolomite, olivine and charcoal impregnated by metal, metal salts or by alkaline or alkaline-earth salts.

* * * * *